US012596522B2

(12) United States Patent
Tessmann et al.

(10) Patent No.: US 12,596,522 B2
(45) Date of Patent: Apr. 7, 2026

(54) ARTIFICIAL REALITY BASED DJ SYSTEM, METHOD AND COMPUTER PROGRAM IMPLEMENTING A SCRATCHING OPERATION OR A PLAYBACK CONTROL OPERATION

(71) Applicant: ALGORIDDIM GMBH, Munich (DE)

(72) Inventors: Federico Tessmann, Munich (DE); Kariem Morsy, Munich (DE)

(73) Assignee: ALGORIDDIM GMBH, Munich (DE)

( * ) Notice: Subject to any disclaimer, the term of this patent is extended or adjusted under 35 U.S.C. 154(b) by 141 days.

(21) Appl. No.: 18/394,763

(22) Filed: Dec. 22, 2023

(65) Prior Publication Data

US 2024/0402981 A1    Dec. 5, 2024

Related U.S. Application Data

(60) Provisional application No. 63/505,851, filed on Jun. 2, 2023.

(51) Int. Cl.
*G06F 3/16*        (2006.01)
*G06F 3/01*        (2006.01)
*G06T 19/00*       (2011.01)

(52) U.S. Cl.
CPC .............. *G06F 3/165* (2013.01); *G06F 3/017* (2013.01); *G06T 19/006* (2013.01)

(58) Field of Classification Search
CPC ........ A63F 13/25; G06F 1/1679; G06F 3/011; G06F 3/016; G06F 3/017; G06F 3/041; G06F 3/044; G06F 3/0488; G06F 3/165;

G06F 17/00; G06F 1/1698; G06F 3/04815; G06F 3/1454; G06T 19/006; G06T 7/593; G10H 1/0008; G10H 1/0025;

(Continued)

(56) References Cited

U.S. PATENT DOCUMENTS 6,541,690 B1 *  4/2003  Segers, Jr.  ...........  G10H 1/0091
                                                      84/743
7,592,534 B2 *  9/2009  Yoshikawa  ..........  G11B 27/329
                                                      84/600

(Continued)

FOREIGN PATENT DOCUMENTS

EP        4068052 A1    10/2022

OTHER PUBLICATIONS

"How to use the Virtual Headphones", Vinyl Reality Wiki, Available online at: https://vinyl-reality.com/wiki/doku.php?id=how_to_use_the_virtual_headphones, May 14, 2019, pp. 1-2.

(Continued)

*Primary Examiner* — Gerald Gauthier
(74) *Attorney, Agent, or Firm* — Kilpatrick Townsend & Stockton LLP

(57)        ABSTRACT
The present invention provides a DJ system for processing audio data, comprising an audio input unit for receiving audio data representing a piece of music, an audio processing unit for processing the audio data, an audio output unit for playing the audio data, and a gesture detecting apparatus for detecting a hand position, which is a position in space of a hand of a user of the system, and wherein the gesture detecting apparatus is configured to detect a turntable approach gesture or a transport control gesture.

20 Claims, 6 Drawing Sheets

Figure 1:
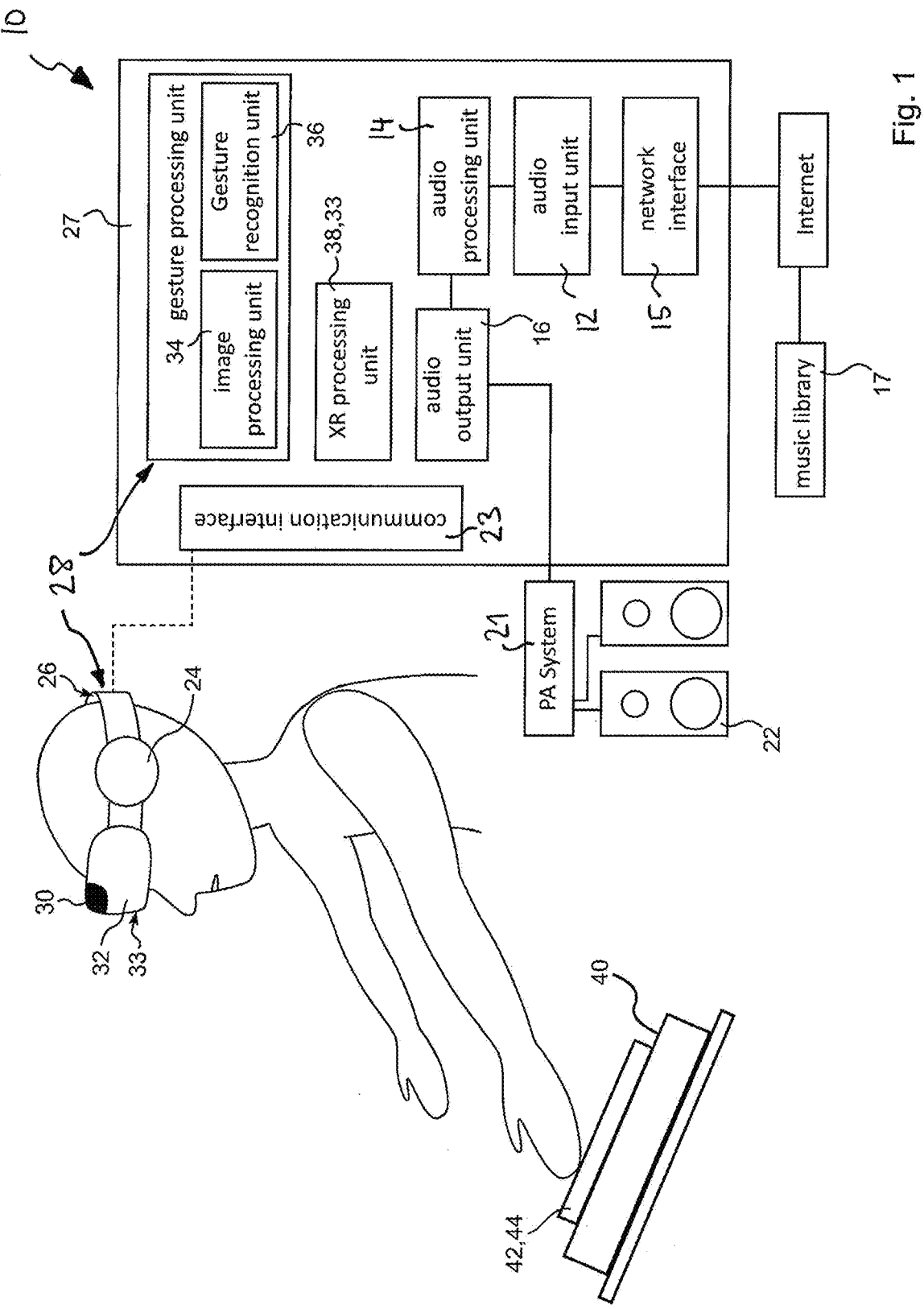

(58) Field of Classification Search
    CPC .. G10H 1/0091; G11B 27/005; G11B 27/102;
                G11B 27/1102; G11B 27/329; G11B
                27/038; G11B 27/105; G06N 3/0464;
            H04H 60/04; H04N 21/4825; H04R 3/00
    See application file for complete search history.

(56)                    References Cited

U.S. PATENT DOCUMENTS

| | | | | |
|---|---|---|---|---|
| 8,369,974 | B2 * | 2/2013 | Daisy | G06F 3/0488 |
| | | | | 700/94 |
| 8,636,199 | B1 * | 1/2014 | Slayden | G10H 1/0091 |
| | | | | 235/375 |
| 9,208,765 | B1 * | 12/2015 | Sivertsen | G10H 1/0008 |
| 9,583,140 | B1 | 2/2017 | Rady | |
| 10,284,695 | B1 | 5/2019 | Geji et al. | |
| 2004/0089141 | A1 * | 5/2004 | Georges | G10H 1/0041 |
| | | | | 84/609 |
| 2006/0034043 | A1 * | 2/2006 | Hisano | G06F 1/1679 |
| | | | | 361/679.04 |
| 2007/0079241 | A1 | 4/2007 | Wang et al. | |
| 2008/0205681 | A1 * | 8/2008 | Norberg | G11B 27/105 |
| | | | | 381/334 |
| 2009/0109795 | A1 * | 4/2009 | Marti | G06F 3/017 |
| | | | | 367/118 |
| 2009/0286601 | A1 | 11/2009 | Rubio et al. | |
| 2010/0013613 | A1 * | 1/2010 | Weston | G06F 3/041 |
| | | | | 340/407.2 |
| 2010/0151946 | A1 * | 6/2010 | Wilson | G06T 7/593 |
| | | | | 463/43 |
| 2010/0318204 | A1 * | 12/2010 | Daisy | G06F 3/0488 |
| | | | | 345/173 |
| 2012/0059494 | A1 | 3/2012 | David | |
| 2012/0130516 | A1 * | 5/2012 | Reinsch | G06F 17/00 |
| | | | | 700/94 |
| 2012/0310392 | A1 * | 12/2012 | Abuelsaad | G06F 3/165 |
| | | | | 700/94 |
| 2013/0131850 | A1 * | 5/2013 | Carrier | G06F 17/00 |
| | | | | 700/94 |
| 2013/0154930 | A1 | 6/2013 | Xiang et al. | |
| 2013/0259238 | A1 | 10/2013 | Xiang et al. | |
| 2013/0305152 | A1 | 11/2013 | Griffiths et al. | |
| 2013/0345842 | A1 | 12/2013 | Karakaya et al. | |
| 2014/0002376 | A1 * | 1/2014 | Oliver | G06F 3/016 |
| | | | | 345/173 |
| 2014/0173440 | A1 | 6/2014 | Dal Mutto et al. | |
| 2014/0214189 | A1 * | 7/2014 | Goodwin | H04H 60/04 |
| | | | | 700/94 |
| 2014/0267002 | A1 * | 9/2014 | Luna | G06F 1/1698 |
| | | | | 345/156 |
| 2014/0316543 | A1 * | 10/2014 | Sharma | G06F 3/1454 |
| | | | | 700/94 |
| 2014/0358263 | A1 | 12/2014 | Irmler et al. | |
| 2015/0148927 | A1 * | 5/2015 | Georges | G06F 3/165 |
| | | | | 700/94 |
| 2015/0220178 | A1 * | 8/2015 | Zeliff | G06F 3/044 |
| | | | | 345/178 |
| 2015/0268921 | A1 * | 9/2015 | Georges | G10H 1/0025 |
| | | | | 700/94 |
| 2015/0286360 | A1 | 10/2015 | Wachter | |
| 2015/0331659 | A1 | 11/2015 | Park | |
| 2015/0355879 | A1 * | 12/2015 | Beckhardt | H04N 21/4825 |
| | | | | 700/94 |
| 2015/0371529 | A1 | 12/2015 | Dolecki | |
| 2016/0116988 | A1 | 4/2016 | Priyantha et al. | |
| 2017/0329409 | A9 | 11/2017 | Chun et al. | |
| 2018/0088672 | A1 | 3/2018 | Schantz et al. | |
| 2018/0182387 | A1 | 6/2018 | Chua et al. | |
| 2018/0192226 | A1 | 7/2018 | Woelfl et al. | |
| 2018/0218561 | A1 | 8/2018 | Oldroyd et al. | |
| 2018/0270576 | A1 | 9/2018 | Chua et al. | |
| 2018/0277160 | A1 * | 9/2018 | Soda | G11B 27/038 |
| 2019/0232500 | A1 * | 8/2019 | Bennett | G06T 19/006 |
| 2019/0236842 | A1 * | 8/2019 | Bennett | G06F 3/04815 |
| 2020/0294313 | A1 * | 9/2020 | Arroyo Palacios | A63F 13/25 |
| 2021/0004146 | A1 | 1/2021 | Linville et al. | |
| 2021/0191526 | A1 | 6/2021 | Heo et al. | |
| 2022/0199056 | A1 * | 6/2022 | Morsy | G06N 3/0464 |
| 2023/0169498 | A1 | 6/2023 | Sado | |
| 2023/0274512 | A1 | 8/2023 | Terre et al. | |
| 2023/0343314 | A1 * | 10/2023 | Morsy | G10H 1/0025 |
| 2023/0419931 | A1 | 12/2023 | Takei et al. | |
| 2024/0071605 | A1 | 2/2024 | Bradley et al. | |
| 2024/0126369 | A1 | 4/2024 | Fujita | |
| 2024/0402981 | A1 * | 12/2024 | Tessmann | G11B 27/102 |
| 2024/0402982 | A1 | 12/2024 | Morsy et al. | |

OTHER PUBLICATIONS

"Master DJ Lessons in VR With Vinyl Reality // Oculus Rift +
Touch // GTX 1060 (6GB)", Paradise Decay, Available online at:
https://www.youtube.com/watch? v=Stqafits5ms, Aug. 21, 2018, 2
pages.
"Mixer Input Control Overview", Vinyl Reality Wiki, Available
online at: https://vinyl-reality.com/wiki/doku.php?id=mixer_input_
control_overview, Aug. 5, 2020, 4 pages.
Behrens , "Hardware, Software: Alles, was du als VR-DJ zum
Auflegen brauchst", Bonedo, Available online at: https://www.
bonedo.de/artikel/hardware-software-alles-was-du-als-vr-dj-zum-
auflegen-brauchst/, Jun. 13, 2019, pp. 1-29.
European Application No. 24179428.8, Extended European Search
Report, Sep. 30, 2024, 11 pages.
U.S. Appl. No. 18/394,694, "Non-Final Office Action", Sep. 24,
2025, 26 pages.
U.S. Appl. No. 18/394,899, "Final Office Action", Sep. 22, 2025, 16
pages.
U.S. Appl. No. 18/394,825, Non-Final Office Action mailed Aug. 7,
2025, 10 pages.
U.S. Appl. No. 18/394,899, Non-Final Office Action, Mailed on
Apr. 17, 2025, 17 pages.
U.S. Appl. No. 18/394,825, "Notice of Allowance", Dec. 10, 2025,
12 pages.
Chen, et al., "Exploring User Defined Gestures for Ear-based
Interactions", Proceedings of the ACM on Human-Computer Inter-
action, vol. 4, Nov. 4, 2020, pp. 1-20.

* cited by examiner

ARTIFICIAL REALITY BASED DJ SYSTEM, METHOD AND COMPUTER PROGRAM IMPLEMENTING A SCRATCHING OPERATION OR A PLAYBACK CONTROL OPERATION

CROSS-REFERENCE TO RELATED APPLICATIONS

This non-provisional application claims priority to U.S. Patent application No. 63/505,851, filed on Jun. 2, 2023, the disclosure of which is herein incorporated by reference in its entirety for all purposes.

DESCRIPTION

The present invention relates to a DJ system for processing audio data comprising an audio input unit for receiving audio data representing a piece of music, an audio processing unit for processing the audio data, an audio output unit for playing the audio data, wherein the system comprises means for performing a scratching operation or a transport control operation on the audio data. Furthermore, the invention relates an audio processing method for a DJ system as well as to a computer program adapted to run on a computer as part of a DJ system.

DJ systems are conventionally known as comprising at least one turntable adapted to carry a vinyl-tape record with one or more pieces of music on it, wherein the record has an inscribed, modulated groove storing audio signals that can be read out by a pickup device of the turntable when the record rotates. The audio signal read out by the pickup device is then amplified and output as an analog audio signal through speakers to an audience and/or through headphones to the DJ. The pickup device may be a needle running within the groove of the record or an optical scanning system detecting the modulations within the grooves of the record by optical means. In order to start or stop playback of the record, the DJ usually positions the pickup device at the starting groove of the record or at any other desired groove of the record and starts the pickup process, or the DJ removes the pickup device from the record and sets it to a stop area, respectively.

In a next step of the technical development, virtual turntables have been generated and displayed by a computer on a suitable display, such as a touchscreen of a tablet computer or a monitor display of a desktop computer. The DJ operates the virtual turntable through touch gestures by touching and selecting the virtual turntable, touching and dragging a virtual pickup device to a predetermined position on the virtual turntable or by operating a computer mouse by clicking on certain elements of the virtual turntable. Operation of the virtual turntable then controls playback of digital audio data. Changing the record is realized in virtual turntables by prompting the user to select another piece of music or another virtual package of pieces of music through dialog boxes or similar selection tools.

Digital virtual turntables may have higher flexibility with regard to changes in functionality and layout and they may have cost advantages, but there are some drawbacks as compared to conventional hardware turntables when it comes to professional operation during a live show, due to limits in the velocity of manipulation of control elements and general performance. For example, a scratching operation controlled by a swiping gesture on a touchscreen may be more difficult because an unintended touch operation of neighboring control elements of the virtual turntable is likely if the user's hand unintentionally leaves the prescribed scratching zone. This problem increases for most of the affordable touchscreens, as the size of the screens is usually much smaller than the size of conventional hardware turntables. Furthermore, binding the DJ to the operation of a tablet computer or desktop computer during the DJ performance often finds limited acceptance among DJs. Furthermore, simulated DJ operations such as gripping and dragging a virtual pickup device on a touchscreen may be a difficult task, as it is usually not intuitive how to actually hold a virtual object during the dragging operation.

The present invention has been made in view of the above-described background, and it is an object of the present invention to provide a system, a method and a computer program for processing audio data, which provide new and intuitive turntable control functionalities for a DJ that are accessible in a quick and reliable manner during a live show.

According to a first aspect of the invention, there is provided a DJ system for processing audio data, comprising an audio input unit for receiving audio data representing a piece of music, an audio processing unit for processing the audio data, an audio output unit for playing the audio data, a gesture detecting apparatus for detecting a hand position, which is a position in space of a hand of a user of the system, and wherein the gesture detecting apparatus is configured to detect a turntable approach gesture when the hand position enters a first tolerance zone around a virtual turntable position, which is a predetermined position in space in an area around the user, wherein the system provides a gesture scratch mode, wherein, when the gesture scratch mode is activated, the system is configured to carry out a scratching operation, the scratching operation including at least one of setting a playback direction of the audio data depending on a direction of movement of the hand, and setting a playback rate of the audio data depending on a movement velocity of the hand, wherein the system is configured for touchless activation of the gesture scratch mode upon detection of the turntable approach gesture by the gesture detecting apparatus.

According to an important feature of the present invention, the system comprises the gesture detecting apparatus for detecting a hand position in space and at least one hand gesture, and the system is configured to perform a scratching operation of the virtual turntable based on the detected hand gesture and position of the hand. Therefore, the scratching operation is controlled by a three-dimensional gesture of the user's hand within the three-dimensional space based on a hand position and a hand movement within the three-dimensional space as detected by the gesture detecting apparatus. Thus, a novel concept for operating a virtual turntable is provided by recognizing 3D hand gestures instead of two-dimensional manipulations on a computer screen.

In particular, according to the present invention, a turntable approach gesture is detected by the gesture detecting apparatus when the hand position enters a first tolerance zone around a virtual turntable position, wherein the first tolerance zone is preferably a three-dimensional zone, i.e., has non-zero dimensions in all three directions in space (for example non-zero values for height (Z), length (X) and width (Y)). The turntable approach gesture is then detected by the gesture detecting apparatus when the 3D hand position enters the 3D first tolerance zone around the predetermined 3D virtual turntable position.

It should be noted in the context of the present invention that a hand posture of a hand of a user is used herein as describing a current form of the hand as regards finger position, angle of the palm with respect to the forearm, etc. Postures are for example a flat hand, a fist, flexion of individual or all fingers, etc. Furthermore, a hand gesture is herein used as describing a particular hand posture or a movement of the hand or parts of the hand in space, optionally in combination with a particular hand posture, or a sequence of movements of the hand in space or a sequence of particular hand postures or a change in hand posture.

Furthermore, according the first aspect of the invention, the system is configured for touchless activation of the gesture scratch mode upon detection of the turntable approach gesture. This means that, when the turntable approach gesture is detected as described above, the system enters the gesture scratch mode independent from any physical operation of a hardware controller switch of a hardware controller through the user or other touch operation. A physical operation of a hardware controller switch herein means that the user, in particular the user's hand, physically touches or contacts a piece of hardware, in particular a hardware button, knob, lever or similar switch element of a hardware controller. According to the invention, the gesture scratch mode is entered or activated independently from such physical operation, i.e. without requiring such physical operation of a hardware controller switch. This in particular means that the system does not use a hardware controller with hardware controller switches to be operated by the hand of the user. In other words, the turntable approach gesture is preferably the only requirement for switching the system from a condition in which the gesture scratch mode is deactivated to a system in which the gesture scratch mode is activated. Preferably, the system is configured to activate the gesture scratch mode immediately upon detection of the turntable approach gesture, regardless of whether or not any other activity or control operation is carried out by the user in this respect. In this way, very fast and reliable scratching operation is possible.

When the gesture scratch mode is activated, the system is configured to carry out a scratching operation as described above, such that playback direction or playback rate is set depending on a direction or a velocity of a movement of the hand, respectively. The relationship between playback and hand movement is preferably set in the same manner as conventionally known for manipulating a vinyl-type record rotating on a hardware turntable by touching the record with the hand and decelerating or accelerating the record or controlling rotational direction and/or velocity of rotation through the physical interaction between the user's hand and the vinyl-type record. This means that, in preferred embodiments of the invention, playback of the audio data is stopped when there is no movement of the hand, playback of the audio data is carried out in forward playback direction when the hand is moved along a circular path in a first direction and playback of the audio data is carried out in reverse direction when the hand is moved along the circular path in a second direction opposite to the first direction. Further, playback rate or playback speed of the audio data is set in accordance with the movement velocity of the hand in the first or second direction. For example, to achieve a particular scratching effect, the hand of the user can be moved alternatively in opposite directions in a virtual record plane and playback of the audio data correspondingly switches alternatively between forward playback and reverse playback. Preferably, playback of the audio data follows the detected movements of the user's hand in a latency-free manner, i.e., with a time lag smaller than 100 milliseconds, more preferably smaller than 50 milliseconds.

As mentioned above, in an embodiment of the invention, the system may activate the gesture scratch mode immediately upon detection of the turntable approach gesture. However, in an alternative embodiment, the system may be configured to enter the gesture scratch mode upon detection of the turntable approach gesture and detection of a predefined hand posture, in particular a flat hand posture. Therefore, the predefined hand posture may be an additional requirement to activate the gesture scratch mode (in other words, the gesture scratch mode is only activate when both conditions, detection of turntable approach gesture and detection of predefined hand position, are fulfilled at some point in time), which may avoid unintentional activation of the gesture scratch mode and therefore unintentional modification of playback rate or playback direction when the user's hand accidentally crosses the first tolerance zone.

In the above-described alternative embodiment, the hand of the user may assume the predefined hand posture already outside the first tolerance zone and the predefined hand posture may be maintained when entering the first tolerance zone. In this case, the system may be configured to immediately activate the gesture scratch mode. In another situation, when the hand of the user enters the first tolerance zone with a hand posture that is different from the predefined hand posture, the system may be configured to not yet activate the gesture scratch mode, i.e. to leave the gesture scratch mode deactivated. If then the hand remains within the first tolerance zone and the hand posture is detected to change and eventually assume the predefined hand posture, the system may then activate the gesture scratch mode immediately (again touchless, i.e., without or independent from any physical operation of a hardware controller switch of a hardware controller through the user). For example, the user may enter the first tolerance zone with a relaxed hand posture or a gripping hand posture or an undefined hand posture, such that the gesture scratch mode remains deactivated, and the gesture-detecting unit continues monitoring hand position and hand posture of the user and, at some point in time, detects that the user's hand assumes the predefined hand posture, in particular a flat hand posture, while the hand position remains within the first tolerance zone, whereupon the system then immediately activates the gesture scratch mode.

When the gesture scratch mode is deactivated (is in a deactivated condition), the system may be configured to set the playback direction of the audio data independently from a direction of movement of the hand and to set a playback rate of the audio data independently from a movement velocity of the hand. Therefore, free movement of the user's hand for performing other tasks and gestures is possible when scratching is currently not to be performed.

Preferably, the gesture detecting apparatus is configured to detect at least one of (1) a first stop scratch gesture corresponding to the hand position leaving a second tolerance zone around the virtual scratch controller position, wherein the first tolerance zone is preferably smaller than the second tolerance zone and is more preferably fully embedded within the second tolerance zone, and (2) a predefined second stop scratch gesture, and the system is configured for touchless deactivation of the gesture scratch mode upon detection of at least one of the first stop scratch gesture and the second stop scratch gesture, i.e., independent from any physical operation of a hardware controller switch of a hardware controller through the user.

The first stop scratch gesture refers to the hand position leaving the second tolerance zone, which provides an intuitive way for the user to stop the gesture scratch mode by removing his/her hand from a virtual turntable. Furthermore, this gesture can reliably be detected. The second tolerance zone is preferably larger than the first tolerance zone, such that the user has some more freedom to deviate from the virtual turntable position during the scratching movement, which assists a user in particular when turning his/her gaze direction away from the virtual turntable position to focus on other DJ controls while continuing scratching.

The second stop scratch gesture may be a change in hand posture. This may provide a quicker and more reliable way for the user to stop the gesture scratch mode. For example, a change in hand-posture from a flat-hand posture to another posture can on the one hand easily be detected by the gesture-detecting unit and on the other hand corresponds to an intuitive gesture that a DJ assumes when stopping scratching. Furthermore, the second stop scratch gesture may be a fist-hand posture.

Preferably, the first stop scratch gesture of the hand position leaving the second tolerance zone is used in combination with any of the above-mentioned or other examples of the second stop scratch gestures, such that the gesture detection apparatus is able to detect both the first stop scratch gesture and the second stop scratch gesture, wherein the system deactivates the gesture scratch mode as soon as one of the first stop scratch gesture and the second stop scratch gesture is detected. This combination achieves the effect that, on the one hand, a gesture scratch mode can quickly and reliably be deactivated by the user through the predefined second stop scratch gesture, and, on the other hand, the gesture scratch mode can still reliably be deactivated when the hand position leaves the second tolerance zone in order to ensure that the DJ does not unintentionally stick to the gesture scratch mode when moving his/her hand towards a different virtual control element, for example.

Again, as for activation of the gesture scratch mode, deactivation of the gesture scratch mode is preferably achieved through a touchless user interface, i.e. independent from any physical operation of a hardware controller switch or a hardware controller through the user.

In a preferred embodiment of the invention, the gesture detecting apparatus comprises a touchless user interface and a gesture recognition unit adapted to recognize a hand gesture based on a detection result of the touchless user interface and gesture data relating to at least one expected hand gesture. The touchless user interface may for example comprise a camera adapted to capture images of the user's hand, and the gesture recognition unit may recognize a hand gesture based on an analysis of the captured camera images. Camera-based gesture detection allows a hands-free natural operation of the system by just moving the hands to certain postures or performing certain gestures. In this way, it is not necessary to provide hardware controllers, and it is not necessary for the user to hold a hardware controller during operation of the system. This also greatly supports a natural scratching gesture for operating the virtual turntable, for example by using a flat hand. Another concept for touchless gesture detection may alternatively be used, for example, a detection using 3D cameras such as stereo cameras, or depth-aware cameras, or a lidar sensor or other hand sensors, or an electromyography-based detection using electrical signals produced by muscles in the body, or data obtained from wired gloves or other wearables having at least one sensor element for touchlessly detecting a hand movement.

In a preferred embodiment, at least one of the first tolerance zone and the second tolerance zone has a shape of a cylinder which includes the virtual scratch controller position, wherein a cylinder axis of the cylinder is pointing towards the user, or upwards, or in an inclined direction upwards and towards the user. By using a cylindrical first/second tolerance zone, the shape of the zone is advantageously adapted to the expected path of movement of the hand during scratching. Furthermore, by having the cylinder axis of the cylinder pointing towards the user or upwards, or in an inclined direction upwards and towards the user, positioning and moving of the user's hand is supported in an ergonomic manner.

In a further preferred embodiment, the system further comprises an artificial reality apparatus adapted to provide visual input for the user to create an artificial reality environment, wherein the artificial reality apparatus is adapted to display a virtual turntable controller at the predetermined virtual turntable position. This allows displaying the virtual turntable to the user such as to invite the user to approach the virtual turntable and to perform a scratch gesture by a corresponding movement of his/her hand.

In the context of the present disclosure, an artificial reality apparatus (XR apparatus) may include a virtual reality apparatus (VR) in which a user's virtual input over substantially the entire field of view is controlled by a computer, wherein the computer displays a virtual environment and virtual objects visible in an area (a three-dimensional space) around the user. The term artificial reality (XR) may also include augmented reality (AR) in which the user views camera images of the real world, wherein the images may be modified, for example by adding virtual objects thereto. Furthermore, the term artificial reality (XR) may include mixed reality (MR), in which the user views a mixture of light coming directly from the real world and light coming from a computer display. MR may for example be realized by a headset comprising a semi-transparent glass allowing the user to see through the semi-transparent glass the real world, wherein at the same time virtual objects are displayed to the user at the semi-transparent glass by a display or a projector. In general, XR (including VR, AR and MR) may be realized by using a headset, such as glasses, which displays or projects images to both eyes of the user, such that the user views artificial objects and an artificial environment in the three-dimensional space surrounding the user. Artificial reality (XR) herein refers to any of VR, AR or MR or combinations thereof.

An artificial reality system is able to display a virtual object within the three-dimensional space around the user, such that the user recognizes the object as being positioned at a particular position in space. Therefore, unlike the situation on a two-dimensional display, such as a tablet display in which the same tablet is viewed with both eyes of the user, the artificial reality apparatus is able to provide a fully immersive experience to the user in which objects are recognized as being arranged at any position in the three-dimensional space. Alternative solutions to headsets are known in the art to create artificial reality (XR), for example caves, which can be entered by the user and which have artificial reality content displayed on the walls of the cave, or holograms.

Preferably, the virtual turntable controller is displayed by the artificial reality apparatus as having a circular shape, in particular a shape of a cylinder, wherein the cylinder preferably has a cylinder axis which is pointing towards the user, or upwards, or in an inclined direction upwards and towards the user. Through the circular shape or cylindrical shape of the virtual turntable displayed by the artificial reality system, the displayed object is easily realized by the user as a virtual turntable and operation is made intuitive.

According to a second aspect of the present invention, the above-mentioned object is achieved by a system for processing audio data, comprising an audio input unit for receiving audio data representing a piece of music, an audio processing unit for processing the audio data, an audio output unit for playing the audio data, and a gesture detecting apparatus for touchless detection of hand gestures of a user's hand, wherein the gesture detecting apparatus is configured to detect a transport gesture of a user, wherein the transport gesture comprises the following sequence: (1) positioning the hand within a third tolerance zone around a first virtual transport controller position which is a predetermined position in space in an area around the user, (2) gripping a virtual transport controller, (3) dragging the virtual transport controller, while holding the gripping posture, from the first virtual transport controller position to a second virtual transport controller position, and (4) releasing the gripping posture, wherein the audio processing unit is configured to carry out a playback setting operation based on a transport gesture detected by the gesture detecting apparatus, the playback setting operation comprising at least one of the following operations: starting playback of the audio data, stopping playback of the audio data, setting a playback position for playback of the audio data, and selecting a piece of music from among a plurality of pieces of music and operating the audio input unit to receive audio data representing the selected piece of music.

According to the second aspect of the invention, a system having a touchless gesture detecting apparatus is provided, which is able to detect transport gestures of a user's hand comprising gripping and dragging a virtual transport controller from a first virtual transport controller position to a second virtual transport controller position. Based on the transport gesture, the system controls playback of audio data. In this way, a novel user interface is provided for commanding playback of audio data based on detection of intuitive hand gestures. In particular, the system of the second aspect is suitable for controlling start or stop of playback of a virtual turntable, changing playback position or changing the piece of music to be played back, without the need to touch any hardware controller or screen.

According to a preferred embodiment of the second aspect of the invention, the audio data are audio data representing a music release package comprising one piece of music or a set of consecutive pieces of music, said music release package having a finite playback duration, and wherein a timeline of the music release package is defined as running from a package start position to a package end position, wherein the gesture detecting apparatus defines a virtual song path arranged in the area around the user and running continuously, preferably linearly or in an arc-shape, from a starting point to an end point, wherein the starting point is assigned to the package start position, the end point is assigned to the package end position, and intermediate points along the path between the starting point and the end point are assigned to respective intermediate playback positions between the package start position and the package end position along the timeline of the music release package, wherein under the conditions that the transport gesture is detected and the second virtual transport controller position at which the user has released the gripping posture in the detected transport gesture is within a fourth tolerance zone around the virtual song path, the audio processing unit is configured to set the playback position for playing the audio data in accordance with the second virtual transport controller position along the virtual song path, and to start or continue playback of the audio data from the playback position.

With the above-described embodiment, a virtual song path, which is a path within the three-dimensional space around the user, is defined, which corresponds to the timeline of the music release package from start to end. Thus, moving the virtual transport controller by the hand of the user along the virtual song path within the three-dimensional space correlates to movement of the playback position along the timeline of the music release package and thus provides an intuitive way to start or stop playback or to control the playback position (jump forwards or rearwards).

The music release package may just comprise one single piece of music, such that the timeline of the music release package equals the timeline of the piece of music. Alternatively, the music release package may comprise a set of consecutive pieces of music, for example an EP or an LP release with a plurality of songs arranged consecutively in certain order one after another, similar to the arrangement of songs on a conventional vinyl-type record.

In a further embodiment, the audio processing unit is configured to stop or keep stopping playback of the audio data, if a transport gesture is detected and the second virtual transport controller position at which the user has released the gripping posture within the detected transport gesture is within a predefined stop zone. This allows reliable and quick stopping of playback by dragging the transport controller to a suitable stop zone, in particular outside the virtual song path. The predefined stop zone may be defined as the space outside the fourth tolerance zone, in particular substantially the entire space outside the fourth tolerance zone, which means that the user can easily stop playback by gripping the virtual transport controller and dragging it away from the virtual song path.

In a preferred embodiment, the system may further comprise an artificial reality apparatus adapted to provide visual input for the user to create an artificial reality environment, wherein the artificial reality apparatus is adapted to display the virtual transport controller at a current virtual transport controller position in the area around the user. This allows displaying the virtual transport controller to the user, such as to invite the user to perform the transport gesture.

Preferably, the artificial reality apparatus is configured to display at least one of a first virtual indication at the starting point of the virtual song path and a second virtual indication at the end point of the virtual song path. In this way, the user has guidance regarding the extension of the virtual song path in the three-dimensional space, such as to make playback control along the timeline more reliable.

In a further preferred embodiment of the second aspect of the invention, the first virtual indication is a first circle running through the starting point and/or the second virtual indication is a second circle running through the end point, and wherein the first circle preferably has a larger diameter than the second circle, and wherein the first circle and the second circle preferably have the same center. By using circular indications, playback control can be achieved based on similar movements as known for conventional vinyl-type records, where the timeline is defined by a radial position starting from an outer rim of the record towards an inner circle of the record. Operation of the virtual transport controller is therefore easy to learn. In particular, the artificial reality apparatus may be adapted to display a virtual turntable carrying a virtual record with an outer circumferential rim of the virtual record forming the first virtual indication and an inner circumferential ring of the record forming the second virtual indication. A user then immediately knows how to operate the virtual transport controller by setting the transport controller to a desired position on the virtual record and therefore starting playback at the corresponding position along the timeline of the music release package.

According to another embodiment of the present invention, the artificial reality apparatus is adapted to display a transport tag in association with the virtual transport controller or the first/second virtual indication, wherein the transport tag shows information regarding the current playback position and/or regarding the piece of music currently played back within the music release package. By means of the transport tag, precise adjustment of the playback position can be achieved, since the user has immediate feedback regarding the current playback position that corresponds to the current position of the transport controller along the virtual song path.

According to a third aspect of the present invention, the above-mentioned object is achieved by a method according to one of the following items, wherein the effects and advantages of the method of the third aspect substantially correspond to the effects and advantages of the corresponding system of the first aspect of the invention as described above.

Item 1: Method for processing audio data, comprising the steps of providing audio data representing a piece of music, processing the audio data, playing the audio data, wherein the method further comprises detecting a hand position, which is a position in space of a hand of a user, and detecting a turntable approach gesture when the hand position enters a first tolerance zone around a virtual turntable position, which is a predetermined position in space in an area around the user, wherein the method provides a gesture scratch mode, wherein, when the gesture scratch mode is activated, the method carries out a scratching operation, the scratching operation including at least one of setting a playback direction of the audio data depending on the direction of movement of the hand, and setting a playback rate of the audio data depending on a movement velocity of the hand, wherein the gesture scratch mode is activated in a touchless manner upon detection of the turntable approach gesture by the gesture detecting apparatus, in particular independent from any physical operation of a hardware controller switch of a hardware controller through the user.

Item 2: Method of item 1, wherein the gesture scratch mode is activated immediately upon detection of the turntable approach gesture.

Item 3: Method of item 1 or item 2, wherein the gesture scratch mode is activated upon detection of the turntable approach gesture and detection of a predefined hand posture, in particular a flat hand posture.

Item 4: Method of at least one of the preceding items, wherein, when the gesture scratch mode is deactivated, the playback direction of the audio data is set independently from a direction of movement of the hand and a playback rate of the audio data is set independently from a movement velocity of the hand.

Item 5: Method of any of the preceding items, wherein the method is configured to detect at least one of (1) a first stop scratch gesture corresponding to the hand position leaving a second tolerance zone around the virtual scratch controller position, wherein the first tolerance zone is preferably smaller than the second tolerance zone and is more preferably fully embedded within the second tolerance zone, and (2) a predefined second stop scratch gesture, and wherein the method deactivates the gesture scratch mode in a touchless manner upon detection of at least one of the first stop scratch gesture and the second stop scratch gesture.

Item 6: Method of at least one of the preceding items, wherein the method uses a camera to capture images of the user's hand, and analyzes the images captured by the camera to recognize a hand gesture based on gesture data relating to at least one expected hand gesture.

Item 7: Method of at least one of the preceding items, wherein the method uses a wearable comprising at least one sensor element for detecting a hand movement.

Item 8: Method of at least one of the preceding items, wherein at least one of the first tolerance zone and the second tolerance zone has a shape of a cylinder which includes the virtual scratch controller position, wherein a cylinder axis of the cylinder is pointing towards the user, or upwards, or in an inclined direction upwards and towards the user.

Item 9: Method of at least one of the preceding items, wherein the method uses an artificial reality apparatus to provide visual input for the user to create an artificial reality environment that includes a virtual turntable controller at the predetermined virtual turntable position.

According to a fourth aspect of the present invention, the above-mentioned object is achieved by a method according to one of the following items, wherein the effects and advantages of the method of the fourth aspect substantially correspond to the effects and advantages of the corresponding systems of the second aspect of the invention as described above.

Item 10: Method for processing audio data, comprising the steps of providing audio data representing a piece of music, processing the audio data, and playing the audio data, wherein the method further comprises detecting a transport gesture of a user by a touchless user interface, for example by using a camera adapted to capture images of the user's hand or by using hand sensors, wherein the transport gesture comprises the following sequence of gestures: (1) positioning the hand within a third tolerance zone around a first virtual transport controller position which is a predetermined position in an area around the user, (2) gripping a virtual transport controller, (3) dragging the virtual transport controller, while holding the gripping posture, from the first virtual transport controller position to a second virtual transport controller position, (4) releasing the gripping posture, wherein the method is configured to carry out a playback setting operation based on a detected transport gesture, the playback setting operation comprising at least one of the following operations:

starting playback of the audio data,
stopping playback of the audio data,
setting a playback position for playback of the audio data
selecting a piece of music from among a plurality of pieces of music and operating the audio input unit to receive audio data representing the selected piece of music.

Item 11: Method of item 10, wherein the audio data are audio data representing a music release package comprising one piece of music or a set of consecutive pieces of music, said music release package having a finite playback duration, and wherein a timeline of the music release package is defined as running from a package start position to a package end position, wherein the method defines a virtual song path arranged in the area around the user and running continuously, preferably linearly or in an arc-shape, from a starting point to an end point, wherein the starting point is assigned to the package start position, the end point is assigned to the package end position, and intermediate points along the path between the starting point and the end point are assigned to respective intermediate playback positions between the package start position and the package end position along the timeline of the piece of music, wherein, under the conditions that the transport gesture is detected and the second virtual transport controller position at which the user has released the gripping posture in the detected transport gesture is within a fourth tolerance zone around the virtual song path, the playback position for playing the audio data is set in accordance with the second virtual transport controller position along the virtual song path, and playback of the audio data is started or continued from the playback position.

Item 12: Method of item 10 or item 11, wherein playback of the audio data is stopped or kept stopped, if a transport gesture is detected and the second virtual transport controller position at which the user has released the gripping posture within the detected transport gesture is within a predefined stop zone.

Item 13: Method of at least one of items 10 to 12, wherein the method uses an artificial reality apparatus to provide visual input for the user to create an artificial reality environment including the virtual transport controller at a current virtual transport controller position in the area around the user.

Item 14: Method of item 13, wherein the artificial reality apparatus displays at least one of a first virtual indication at the starting point of the virtual song path and a second virtual indication at the end point of the virtual song path, wherein the first virtual indication preferably is a first circle running through the starting point and/or wherein the second virtual indication preferably is a second circle running through the end point, wherein the first circle preferably has a larger diameter than the second circle, and wherein the first circle and the second circle preferably have the same center.

Item 15: Method of at least one of items 10 to 14 wherein the artificial reality apparatus displays a transport tag in association with the virtual transport controller and/or the first virtual indication and/or the second virtual indication, wherein the transport tag shows information regarding the current playback position and/or regarding the piece of music currently played back within the music release package.

Figure 2:
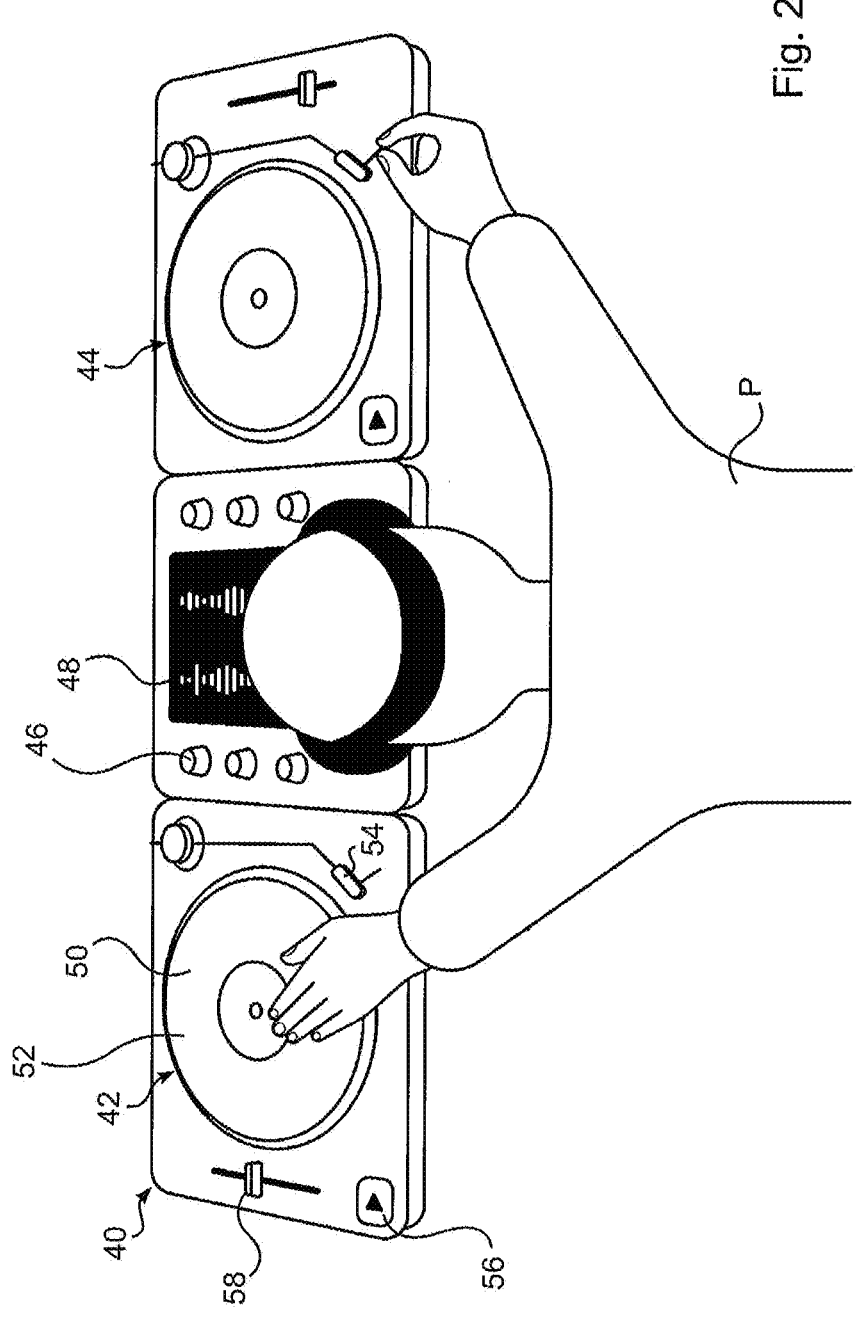
Figure 4:
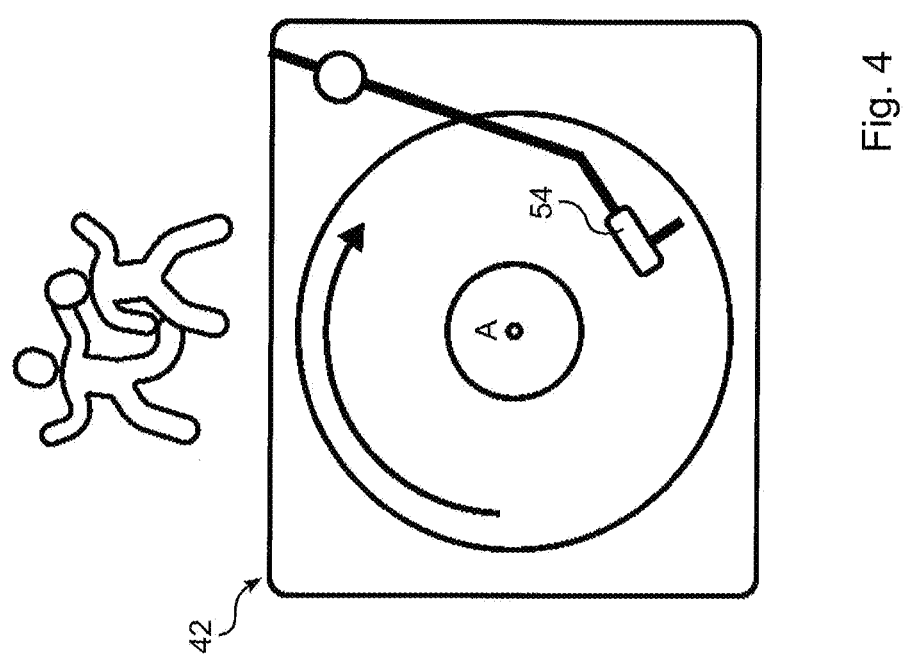
Figure 3:
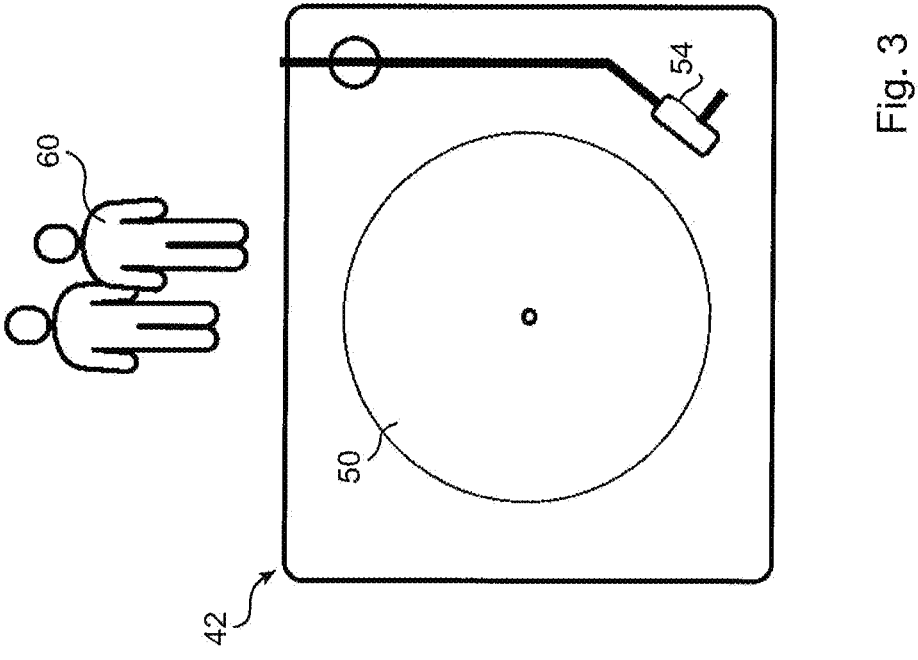
Figure 6:
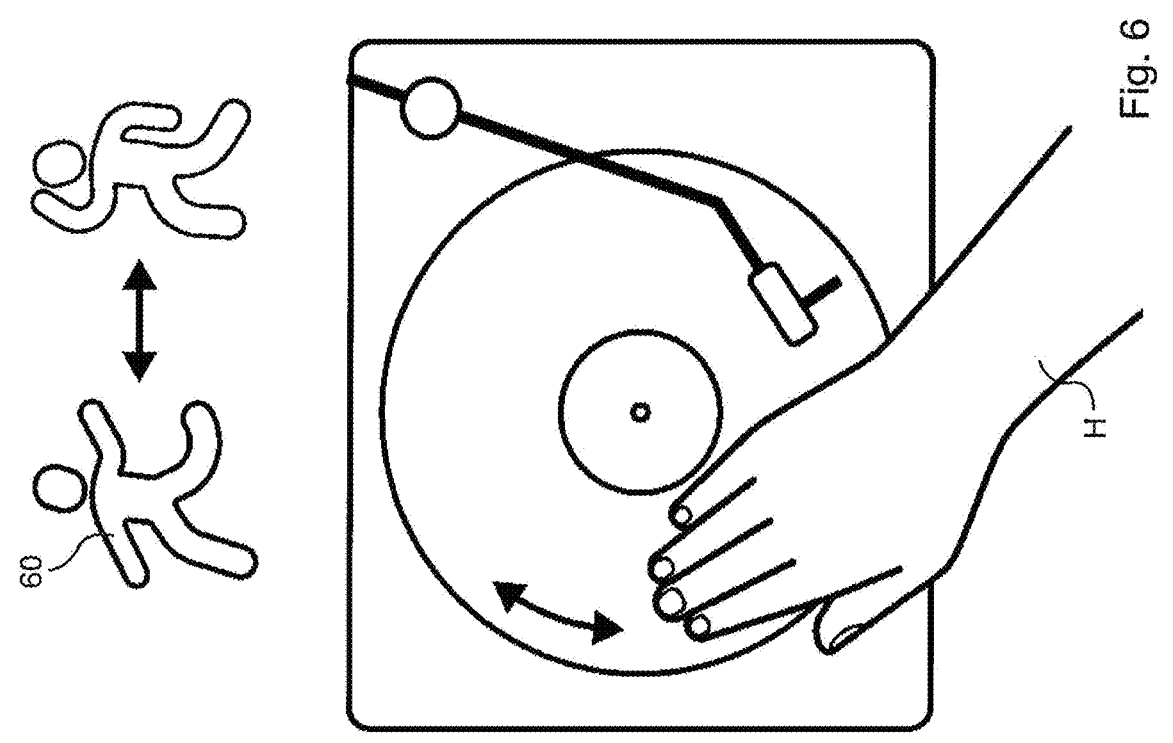
Figure 5:
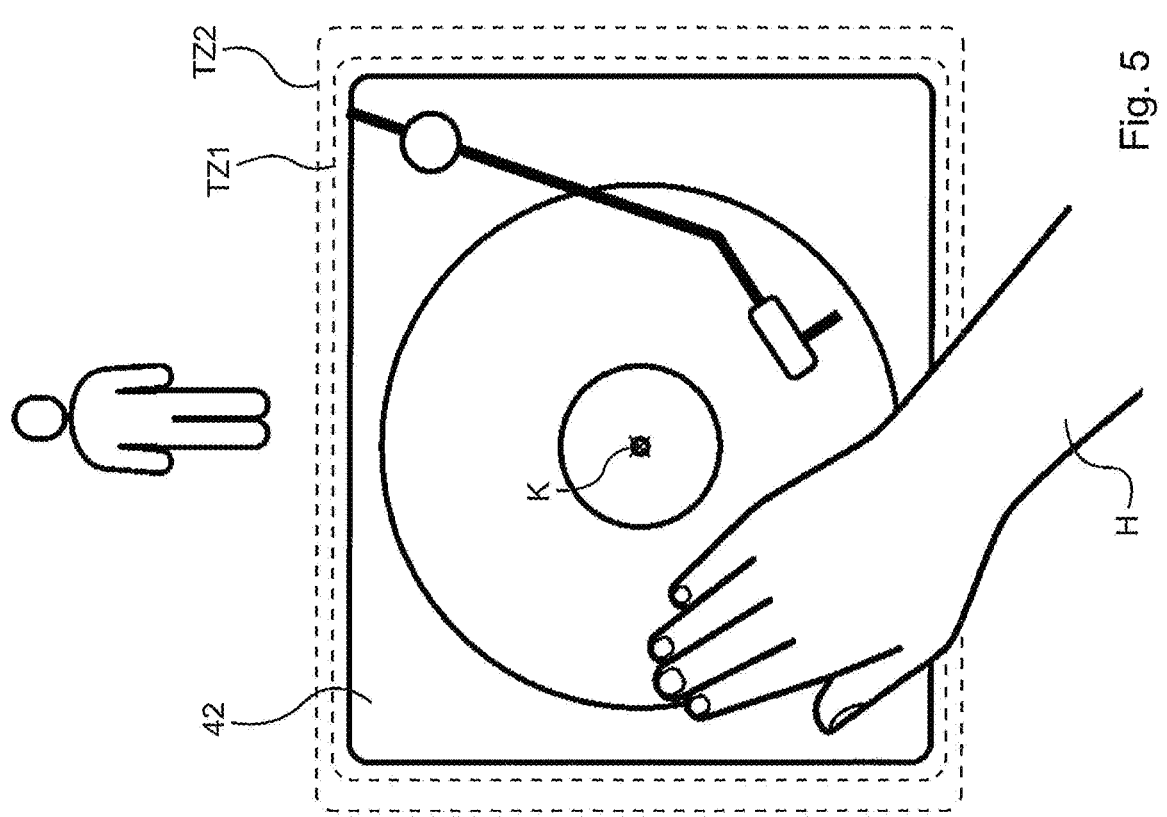
Figure 7C:
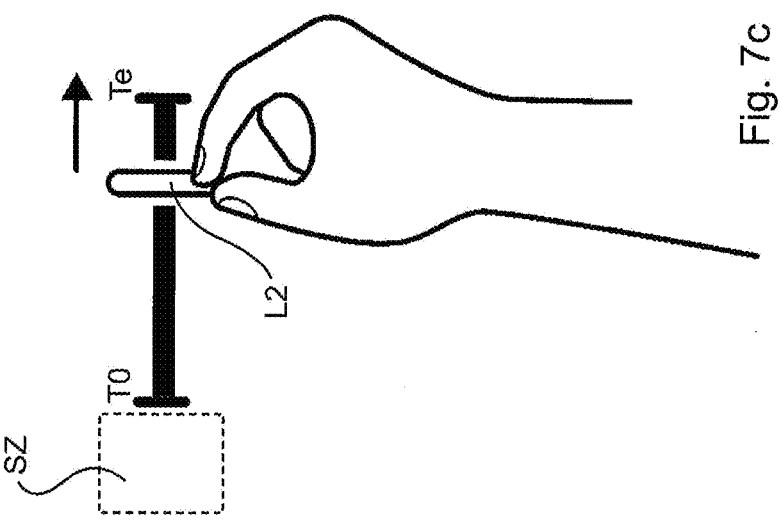
Figure 7B:
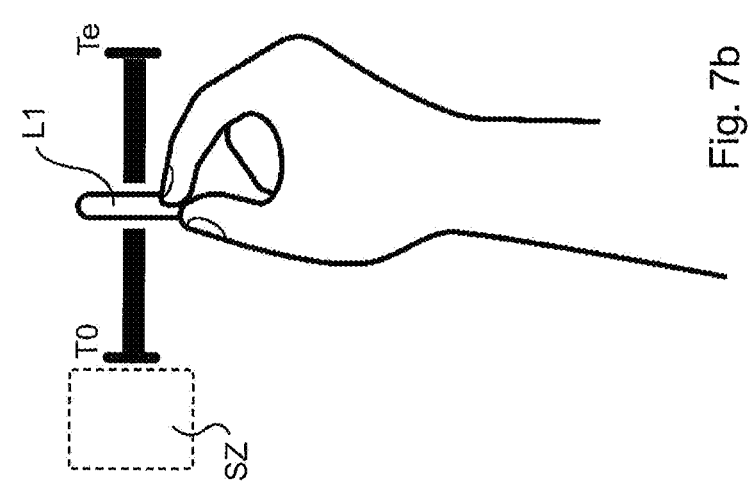
Figure 7A:
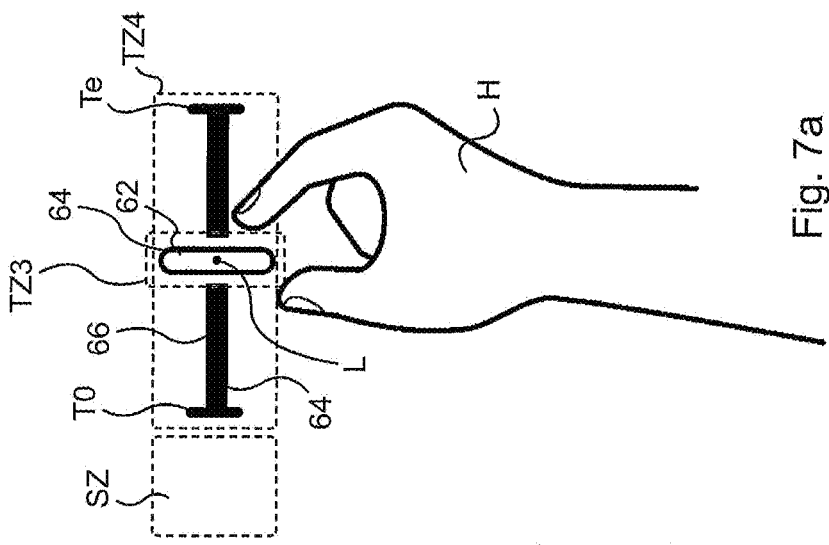
Figures 8A, 8B, 8C:
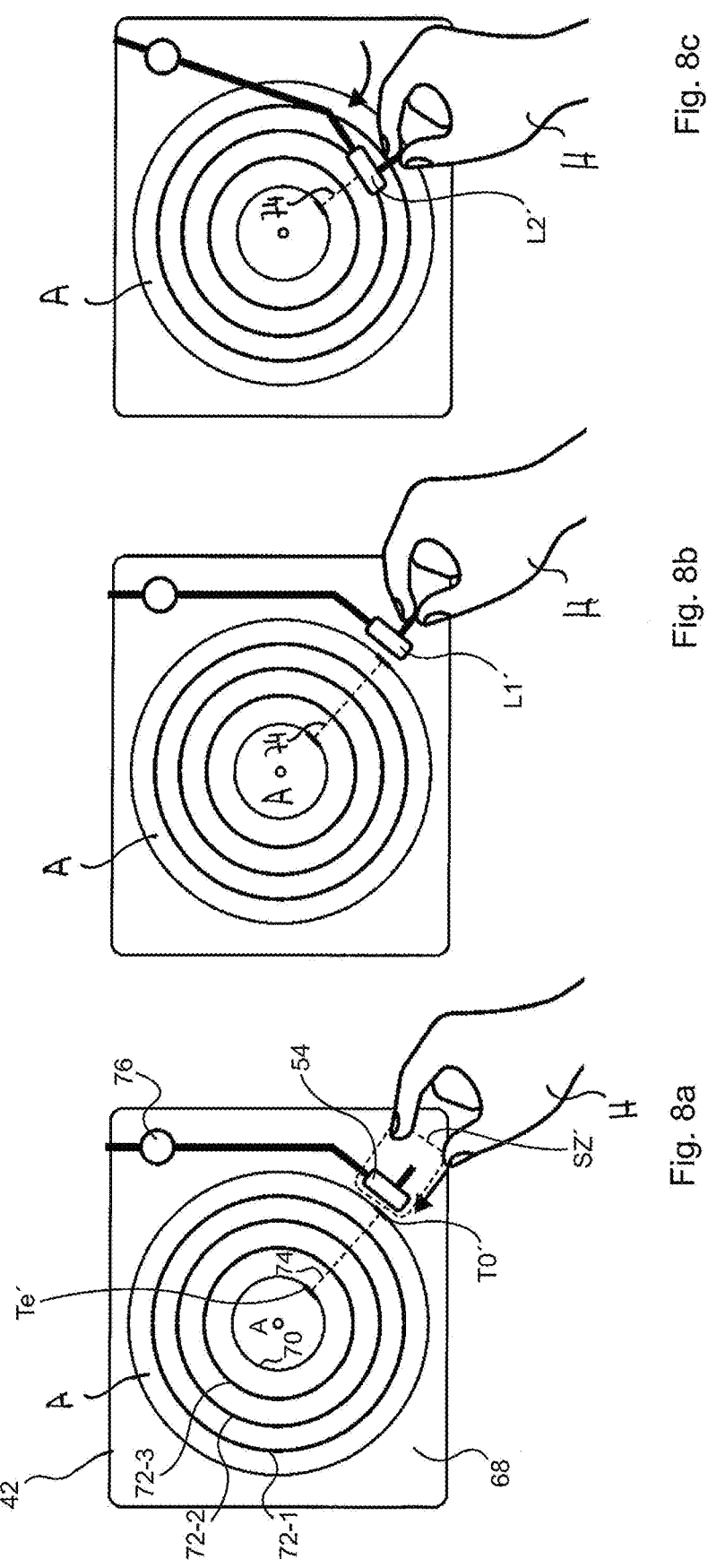

A preferred embodiment of the invention will now be described with reference to the drawings, in which FIG. 1 is a schematic illustration of a system for processing audio data according to the embodiment of the present invention, FIG. 2 is an illustration of an artificial reality environment generated by the system of the embodiment, FIG. 3 illustrates an artificial reality environment generated by the system of the embodiment for an inactive turntable, FIG. 4 illustrates an artificial reality environment generated by the system of the embodiment for a turntable in a normal playback mode, FIG. 5 illustrates an artificial reality environment of the system of the embodiment with a virtual turntable in a gesture scratch mode when playback is halted by a hand gesture, FIG. 6 illustrates an artificial reality environment generated by the system of the embodiment with a virtual turntable in a gesture scratch mode when playback rate and/or playback direction are manipulated based on a hand gesture, FIGS. 7A, 7B and 7C show a virtual transport controller in an artificial reality environment generated by the system of the embodiment in different stages of a transport control operation, and FIGS. 8A, 8B and 8C show a virtual turntable in an artificial reality environment generated by the system of the embodiment in different stages of a transport control operation.

With reference to FIG. 1, a system 10 for processing audio data according to the embodiment of the present invention generally comprises an audio input unit 12, an audio processing unit 14 and an audio output unit 16. Audio input unit 12 is configured to receive input data, which are audio data representing a piece of music such as a song, for example via streaming through a network interface 15 of the system 10 via the Internet from a remote music library 17, which may be a commercial music distribution platform (for example Apple Music or Spotify). Alternatively, audio input unit 12 may receive audio data from a local storage device, for example a local hard drive integrated in or connected to the system 10. The piece of music may be provided to or by the audio input unit 12 in any conventional digital format, in particular standard audio formats, such as MP3, WAV, AIFF, etc. The audio data may be provided in a decompressed format and/or audio input unit 12 may include a decompressor for decompressing audio data received in compressed format.

Audio processing unit 14 is preferably connected to audio input unit 12 to receive input data from audio input unit 12, and is configured to process the input data so as to obtain output data, which are sent to audio output unit 16 for output. Audio processing unit 14 preferably controls playback of audio data, i.e., starts playback, stops playback, or sets or changes playback position along the playback time axis. Furthermore, audio processing unit 14 preferably is capable of changing playback rate (playback velocity) of the audio data relative to the normal playback rate as defined by the input data, based on a predetermined desired playback rate, by suitably resampling the audio data and thereby stretching or compressing the audio data along the time axis. Moreover, audio processing unit 14 preferably is capable of changing playback direction of the audio data from normal forward playback to reverse playback, according to a predetermined desired playback direction.

Audio processing unit may further modify the input data, for example by applying filters, audio effects, or equalizers, or by mixing the input data with other audio data, for example with audio data of another piece of music, etc.

Audio output unit 16 is configured to receive the output data from audio processing unit 14 and to process it for sound output. For this purpose, audio output unit 16 may include a digital-to-analog converter for converting the digital output data into analog audio signals and may be connected to a PA system 21 having a pair of speakers 22 such as to make the output data audible, for example for an audience. Furthermore, audio output unit 16 is preferably connected to a communication interface, in particular a wireless communication interface 23, for transmitting the output data or the audio signals obtained therefrom to headphones 24 of a headset 26 wearable on a head of a user P, such as to make the output data audible for the user P. Preferably, system 10 is configured for processing stereo or multi-channel audio data, such that audio output unit 16 outputs the audio signals via at least two channels (in particular two stereo channels) including a left channel and a right channel sent to left and right speakers 22 or left and right sides of headphones 24, respectively. In this way, stereophonic or spatial audio is provided.

One or more of the above-described components as well as the components described below may be implemented by a computer 27, which includes a microprocessor, a volatile memory, i.e. a random-access memory (RAM), a non-volatile memory, i.e. a read-only memory (ROM) or a hard drive (HDD) or solid-state drive (SSD), and connectivity means, for example a wireless network interface (e.g. a Bluetooth interface or a WLAN interface), or a USB interface. Computer 27 may be a standard tablet computer, a smartphone or a desktop computer, and it may be carried on with the user P or disposed at a distance to user P. Computer 27 may be integrated into headset 26. In another embodiment, computer 27 may be implemented as a plurality of separate processing units, wherein some of the separate processing units may be carried on with the user P while others may be disposed stationary and/or remote with respect to the user, wherein the separate processing units are connected to one another by wireless connections (e.g. Bluetooth) or wire-based connections (e.g. USB) such as to implement the functions of the system 10 as described herein above and below.

System 10 further includes a gesture detecting apparatus 28 for detecting a position, a posture and a movement of a hand H of the user, and for recognizing hand gestures. Gesture detecting apparatus 28 may in particular include a camera 30 configured and positioned to capture images of the hand H. Camera 30 may be mounted to headset 26 and may for example be integrated into a display 32 of headset 26. Alternatively, camera 30 may be disposed at some distance to the user P and directed such as to view the user's hand H.

Gesture detecting apparatus 28 may further include an image processing unit 34, which receives images captured by a camera 30 and a gesture recognition unit 36, which receives images processed by image processing unit 34. The gesture-recognition unit 36 is adapted to analyze the images captured by the camera in order to recognize at least one hand gesture. Interpretation of the camera images or camera videos may be based on an appearance-based model using a template database. For example, gesture recognition unit 36 may compare images or sequences of images captured by camera 30 with reference images or reference image sequences taken from the template database, wherein the reference images or reference image sequences show particular known hand gestures of the same or another user, which have been previously captured by the same or a different camera. Based on a difference between the currently captured images of a hand H of a user P and the reference images or reference image sequences, gesture recognition unit 36 may classify hand gestures and eventually decide whether a current hand gesture resembles a particular reference gesture.

In other embodiments of the invention, gesture detection apparatus 28 may use other concepts of gesture detection, for example based on data captured by 3D cameras such as stereo cameras or depth-aware cameras. Suitable algorithms for interpretation of 3D camera data are volumetric or skeletal models. Furthermore, electromyography-based models interpreting electrical signals produced by muscles in the body or data obtained from wired gloves may be used. In the embodiment of the invention as shown in FIGS. 1 to 6, a touchless user interface (TUI) is preferably used for gesture detection, i.e., an interface obtaining data related to hand gestures without physically touching a hardware controller, such as a handheld controller, a keyboard, a mouse, or a screen.

Alternatively or in addition, gesture detecting apparatus 28, in particular gesture-recognition unit 36, may include an artificial intelligence unit (not shown in FIG. 1), which may comprise a neural network trained to recognize particular hand gestures. The neural network may be trained using training data, which comprise images or image sequences of a hand gesture and associated identification of a particular hand gesture. After training, the trained neural network is then able to classify new hand gestures observed by the gesture detecting apparatus 28 and to decide whether or not the new hand gesture corresponds to a particular predefined hand gesture.

System 10 further includes an artificial reality (XR) apparatus 33 comprising the display 32 mounted on the headset 26 to be viewed by user P. Thus, display 32 may be an XR display 32 and headset 26 may be an XR headset 26. XR display 32 is configured and mounted to XR headset 26 in such a manner as to cover substantially the entire field of view of both eyes of user P such as to allow full or partial immersion of the user into an artificial surrounding generated by the XR apparatus. In particular, the XR apparatus 33 is configured to display virtual objects at certain 3D positions in space in an area around user P, such that the user has an illusion of the objects actually existing at the respective positions in space. Furthermore, XR apparatus 33 may comprise an XR processing unit 38 for generating XR data to be displayed by XR display 32.

FIG. 1 and FIG. 2 illustrate an artificial environment as generated by the XR apparatus 33, wherein a number of virtual objects are projected at respective positions within the space in front of user P (note that in FIG. 2 the indication of user P is meant to illustrate a real person, and not a part of the artificial reality produced by XR apparatus 33).

In particular, a virtual DJ deck 40 with one or more virtual turntables 42 and 44 are displayed in front of a user P. DJ deck 40 may be displayed as a three-dimensional object in the space in front of user P, for example at a usual position of a DJ deck when placed on a table in front of user P. Virtual DJ deck 40 may further have additional control elements such as virtual effect knobs 46 for setting audio effects, a cross-fader (not illustrated in the figures) for mixing audio data associated to virtual turntable 42 with audio data associated to virtual turntable 44 at a desired volume ratio, or a waveform display 48 which shows a graphical representation of the audio data played back.

In association with the two or more virtual turntables 42, 44, two or more different pieces of music may be played back simultaneously by the system 10 and their signals may be mixed by using one or more crossfaders to obtain output data for playback which contain components of two or more different pieces of music. In such embodiments, two or more audio input units 12 and two or more audio processing units 14 may be provided, wherein each of the audio processing units may be controlled based on hand gestures detected by gesture detecting apparatus 28, and a mixing unit (not illustrated) may be provided to receive audio data from all audio processing units, and mix the audio data to obtain mixed audio data, which are passed to audio output unit 16 for sound output. In the following, only the first virtual turntable 42 will be explained in more detail, although all further turntables, if any, may be configured in the same manner as the first turntable 42.

As can be seen in FIG. 2, virtual turntable 42 comprises a virtual rotatable plate 50 adapted to carry a virtual record

52, a virtual pickup device 54 for starting or stopping playback or for changing a playback position, a virtual start/stop button 56, which can also be operated to start or stop playback of virtual turntable 42, and an additional control element, for example a virtual fader 58 for adjusting at least one additional operating parameter, for example a volume of turntable 42.

FIG. 3 shows an enlarged view of the virtual turntable 42 in a deactivated state, in which a rotatable plate 50 is displayed as being empty, i.e., not carrying any virtual record 52. Virtual pickup device 54 is displayed as positioned in a stop position away from the rotatable plate 50. Accordingly, audio processing unit 14 associated with the virtual turntable 42 is not delivering any output data to audio output unit 16.

In the situation shown in FIG. 4, the artificial reality apparatus 33 displays virtual turntable 42 as playing back a virtual record, for example a virtual record A as selected from a plurality of virtual records. This means that the rotatable plate of virtual turntable 42 appears to carry and rotate virtual record A in clockwise direction, and virtual pickup device 54 is placed apparently at the surface of virtual record A according to a current playback position. As a consequence, playback of audio data associated with virtual record A is carried out by audio processing unit 14 at the current playback position and output data are sent to audio output unit 16 for sound output through speakers 22 and/or headphones 24.

The artificial reality apparatus 33 may further display motion graphics such as moving virtual objects, moving visuals, a video clip or any other dynamic visualization along with the playback of the audio data. This means that the motion graphics is moving when audio data are played back through audio output unit 16, while the motion graphics is stopping or is not moving or is not being displayed, or is displayed as inactive, when playback of audio data associated with virtual turntable 42 is stopped or not yet started.

In the particular embodiment shown in the figures, the motion graphics may be at least one animated virtual object 60, for example an animated virtual dancer performing dancing movements when audio data of turntable 42 are played back and standing still when audio data of turntable 42 are not played back.

FIGS. 5 and 6 show situations in which the hand H of the user P has approached the virtual turntable 42, such that a gesture scratch mode is activated. It should be noted that XR apparatus 33 may display an artificial representation of the user's hand H (i.e., a virtual computer-generated hand) in accordance with the current position and a posture/gesture of the hand H detected by the gesture detecting apparatus 28, such as to provide visual feedback to the user regarding the detecting result of the gesture detecting apparatus 28. Alternatively, the XR apparatus 33 may implement AR or MR capabilities in order to let the user view a live-camera image of his/her hand H or real light coming from his/her hand H.

The gesture scratch mode of system 10 may be activated when the gesture detecting apparatus 28 detects a turntable approach gesture, wherein the position in space of a hand H enters a first tolerance zone TZ1, which is a three-dimensional zone around virtual turntable position K, in particular a three-dimensional zone defined around virtual turntable 42 or substantially corresponding to the extensions of the virtual turntable 42 in the three-dimensional space. In addition, in the present embodiment, the system 10 may define a second requirement for activating the gesture scratch mode, namely that a predefined start scratch gesture of the hand H is detected, in particular a flat hand posture as can be seen in FIGS. 5 and 6. This means that the gesture scratch mode is only activated upon detection of both, the hand position being within the first tolerance zone TZ1 and the hand describing the predefined start scratch gesture. According to the invention, however, no additional touch-based control operations are required for entering the gesture scratch mode, i.e., no physical operation of a hardware controller, a mouse or a touchscreen, etc. In an alternative embodiment, the gesture scratch mode may be activated immediately when detecting that the hand position enters or is within the first tolerance zone TZ1, regardless of the current hand posture or any other hand gesture.

When the gesture scratch mode is activated, the system 10 is configured to carry out a scratching operation, in which playback direction of the audio data is set depending on a direction of movement of the hand H and/or a playback rate (playback velocity) of the audio data is set depending on a movement velocity of the hand H. In the example situation shown in FIG. 5, hand H is not moved, i.e., is held stationary. "Not moved" or "stationary" herein means that movement of the hand is smaller or slower than a natural residual movement of the hand, which can usually not be avoided even if the user is trying to hold his/her hand stationary. More specifically, system 10 may regard the hand H of the user as being stationary or a movement of the hand H being stopped when movement velocity of the hand H is below a certain threshold value.

If the gesture detecting apparatus 28 thus detects that the hand H of the user is held stationary while the system 10 is in the gesture scratch mode, playback of audio data is stopped by audio processing unit 14 and consequently no audio output is provided by audio output unit 16. Therefore, the user P has halted the playback of the music by the scratch gesture. If the system uses motion graphics in synchronization with audio playback as described above, the motion graphics will also stand still. The user will therefore have the impression to hold back audio and video.

When the user P moves his/her hand H alternatively in opposite directions across the virtual surface of the virtual record A as shown in FIG. 6, playback of the audio data associated to turntable 42 will change its playback direction alternatively between forward playback and reverse playback corresponding to the movement of the hand H such as to achieve a known scratching audio effect. Furthermore, the playback rate of forward playback as well as reverse playback will depend on the movement velocity of the user's hand H.

When performing the scratching gestures as shown in FIG. 6, in an embodiment of system 10 using motion graphics, the motion graphics will preferably repeatedly move in an alternating manner in forward direction and in reverse direction, in synchronization with the audio data. For example, if the motion graphics contains at least one animated virtual object 60, such as a virtual dancer, the virtual dancer will perform a current dancing move repeatedly in forward and reverse directions in synchronization with playback of the audio data. The user will therefore have an impression of controlling playback of audio as well as video by the scratching movement of his/her hand H.

After having activated the gesture scratch mode by entering the first tolerance zone TZ1, the user may turn his/her focus to other DJ tasks and may therefore move gaze direction towards other areas in his/her field of view. As a result, it may become more difficult for the user P to maintain his/her hand position within the first tolerance zone TZ1. In order to avoid an unintended interruption of the gesture scratch mode, a second tolerance zone TZ2 may be defined by the system 10, which is larger than and preferably fully includes the first tolerance zone TZ1. The system may then be configured to maintain the gesture scratch mode in an activated condition even if the hand position of hand H leaves the first tolerance zone TZ1, as long as the hand position remains within the second tolerance zone TZ2. Only if the hand position leaves the first tolerance zone TZ2, the gesture scratch mode is deactivated.

System 10 may provide for an earlier deactivation of the gesture scratch mode even while the hand position of hand H is still within the second tolerance zone TZ2 or even still within the first tolerance zone TZ1, on the basis of a predefined stop scratch gesture as detected by the gesture detecting apparatus 28. For example, a fist hand may be defined as the predefined stop scratch posture. In another variant, a transition from a flat hand posture towards another posture, for example towards a fist hand posture, may be used by the system 10 as the predefined stop scratch gesture. For example, the gesture scratch mode can be immediately activated when the gesture detecting apparatus 28 detects a transition of the hand posture from a flat hand posture towards another posture, without requiring any further user interaction.

FIGS. 7A, 7B and 7C show an example for a virtual transport controller 62 provided for controlling playback transport, i.e., start of playback, stop of playback, change of current playback position, etc. The virtual transport controller 62 may be displayed by the XR apparatus 33 as a virtual slider that can be moved in linear direction and has a grip portion 64 inviting a user to perform a gripping movement for interaction. The system 10 may define a virtual transport controller position L of the virtual transport controller 62, which is a position within the three-dimensional space around a user P. The XR apparatus 33 preferably displays the virtual controller 62 at the virtual transport controller position L.

Gesture detecting apparatus 28 may be configured to detect a transport gesture of hand H of the user P when detecting a sequence of positioning the hand H within a third tolerance zone TZ3 around the virtual transport controller position L (or at least parts of the hand H, such as two fingers entering the third tolerance zone TZ3), gripping the virtual transport controller 62, dragging the virtual transport controller 62, while holding the gripping posture, from a first virtual transport controller position L1 (FIG. 7B) to a second virtual transport controller position L2 (FIG. 7C) and afterwards releasing the gripping posture. In this sequence defining the transport gesture, FIG. 7A illustrates the first gesture of the sequence, i.e., approaching the third tolerance zone TZ3. The second gesture of the sequence, gripping the virtual transport controller 62 is shown in FIG. 7B. Here, the gesture detecting apparatus 28 may reliably detect a gripping gesture when detecting a contact between two fingertips as made in a typical pinch gesture. The third gesture in the above-mentioned sequence defining the transport gesture relates to dragging the virtual transport controller 62 from the first virtual transport controller position L1 to the second virtual transport controller position L2, which is shown in FIG. 7C. The last gesture of the sequence, releasing the gripping posture, is not shown in the figures, but it is noted that the hand posture when releasing the gripping posture may be similar to the hand posture as shown in FIG. 7A.

XR apparatus 33 may further display a virtual song path 66, which corresponds to a timeline of the audio data associated with turntable 42, i.e. a timeline of virtual record A, such that a left end T0 of virtual song path 66 corresponds to a beginning or start time of record A, while a right end Te of virtual song path 66 corresponds to an end time of record A. Alternatively, the virtual song path 66 may correspond to a timeline of a single piece of music from among the plurality of pieces of music on virtual record A, such that the left end T0 of the virtual song path 66 corresponds to the beginning of the piece of music and the right end Te of virtual song path 66 corresponds to the end of the piece of music.

The system 10 may further define a fourth tolerance zone TZ4 along and around the virtual song path 66, wherein, when the virtual transport controller is released at a release position within the fourth tolerance zone, the system 10 sets the second virtual transport controller position to a position on the virtual song path that is closest to the release position. The position of the virtual transport controller 62 along the virtual song path 66 then again defines the playback position of the audio playback along the timeline of the piece of music or the timeline of the music release package.

Furthermore, XR apparatus 33 may display a stop zone SZ, for example near the start TO of the virtual song path 66. When the virtual transport controller 62 is gripped and dragged by the user's hand H away from the virtual song path 66 and towards stopping zone S2 and is released there, the playback may be stopped immediately. Alternatively, playback of audio data may be stopped when the user grips virtual transport controller 62 and drags it to any other position in space outside the fourth tolerance zone TZ4 and releases the gripping posture at such position outside TZ4.

FIGS. 8A, 8B and 8C illustrate another implementation of a virtual transport controller by using the virtual pickup device 54 of the virtual turntable 42. This implementation can be realized in addition or as an alternative to the virtual transport controller 64 as described with respect to FIGS. 7A, 7B and 7C.

As can be seen in FIG. 8A, XR apparatus 33 displays the virtual record A currently played by virtual turntable 42 as having an outer circumferential rim 68 and an inner ring 70, which have the same center as the rotational axis of record A. Between outer circumferential rim 68 and inner ring 70, one or more virtual demarcation rings 72-1, 72-2, 72-3, . . . may be displayed as an indication for the transitions between the pieces of music apparently stored on virtual record A. Therefore, the outer circumferential rim 68 and the inner circle 70 and optionally the demarcation circles 72-1, 72-2, 72-3 transport the visual impression of a vinyl-type record and therefore invite the user P to position the virtual pickup device 54 at a desired position at the apparent surface of record A in order to start playback at a desired position or to remove virtual pickup device 54 from the virtual record A to stop playback. Therefore, a virtual song path 74 is here defined in a substantially linear shape or, more precisely, an arc shape according to the path of movement of the virtual pickup device 54 as being pivotable about a pickup arm axis 76, wherein the virtual song path 74 starts from the outer circumferential rim 68 and reaches to the inner circle 70. The starting point of the virtual song path 74, at which the virtual song path 74 intersects with the outer circumferential ring 68, corresponds to a start position of the piece of music or the music release package played back by virtual turntable A. The end point of the virtual song path 74, at which the virtual song path 74 intersects with the inner ring 70, corresponds to an end position of the piece of music or the music release package.

FIG. 8A illustrates an approach gesture in which the hand H of user P enters a fifth tolerance zone (not illustrated) around virtual pickup device 54, while FIG. 8B illustrates the situation, wherein the user's hand H assumes a gripping posture after having entered the fifth tolerance zone near the pickup device 54. In FIG. 8C, the user moves the hand H along the virtual song path 74 while maintaining the gripping posture, thereby dragging the virtual transport controller along the virtual song path 74 from a first virtual transport controller position L1' to a second virtual transport controller position L2'. As soon as the user releases the gripping gesture at the second virtual transport controller position L2' (release hand posture not shown in the figures), playback of audio data associated to turntable 42 is started from a position along the timeline of the piece of music or the timeline of the music release package that corresponds to the position of the second virtual transport controller position L2' along virtual song path 74.

A stop zone SZ' may also be defined at the virtual turntable 42 outside the virtual record A and therefore outside the virtual song path 74. In the illustrated example shown in FIGS. 8A and 8B, the first virtual transport controller position L1' is within the stop zone SZ', which means that playback is stopped as long as the virtual pickup device 54 is at L1'. Alternatively, the stop zone may be defined as comprising all positions in space outside the virtual song path 74 (or outside a predetermined tolerance zone around virtual song path 74), such that the user may stop playback of virtual turntable 42 by simply moving the virtual pickup device 54 away from virtual record A.

What is claimed is:

1. A system for processing audio data, comprising:
an audio input unit for receiving audio data representing a piece of music;
an audio processing unit for processing the audio data;
an audio output unit for playing the audio data;
a gesture detecting apparatus for detecting a hand position, which is a position in space of a hand of a user of the system, and wherein the gesture detecting apparatus is configured to detect a turntable approach gesture when the hand position enters a first tolerance zone around a virtual turntable position, which is a predetermined position in space in an area around the user;
wherein the system provides a gesture scratch mode, wherein, when the gesture scratch mode is activated, the system is configured to carry out a scratching operation, the scratching operation including at least one of setting a playback direction of the audio data depending on a direction of movement of the hand, and setting a playback rate of the audio data depending on a movement velocity of the hand; and
wherein the system is configured for touchless activation of the gesture scratch mode upon detection of the turntable approach gesture by the gesture detecting apparatus.

2. The system of claim 1, wherein the system is configured to activate the gesture scratch mode immediately upon detection of the turntable approach gesture.

3. The system of claim 1, wherein the system is configured to activate the gesture scratch mode upon detection of the turntable approach gesture and detection of a predefined hand posture.

4. The system of claim 1, wherein, when the gesture scratch mode is deactivated, the system is configured to set the playback direction of the audio data independently from a direction of movement of the hand and to set a playback rate of the audio data independently from a movement velocity of the hand.

5. The system of claim 1, wherein the gesture detecting apparatus is configured to detect at least one of:

wherein the system is configured a first stop scratch gesture corresponding to the hand position leaving a second tolerance zone around a virtual scratch controller position; or
a second stop scratch gesture; and
for touchless deactivation of the gesture scratch mode upon detection of at least one of the first stop scratch gesture and the second stop scratch gesture.

6. The system of claim 1, wherein the gesture detecting apparatus comprises a touchless user interface.

7. The system of claim 5, wherein at least one of the first tolerance zone and the second tolerance zone has a shape of a cylinder which includes the virtual scratch controller position, wherein a cylinder axis of the cylinder is pointing towards the user, or upwards, or in an inclined direction upwards and towards the user.

8. The system of claim 1, further comprising an artificial reality apparatus adapted to provide visual input for the user to create an artificial reality environment, wherein the artificial reality apparatus is adapted to display a virtual turntable controller at a predetermined virtual turntable position.

9. The system of claim 8, wherein the virtual turntable controller is displayed as having a circular shape.

10. The system of claim 5 wherein the first tolerance zone is smaller than the second tolerance zone and is more fully embedded within the second tolerance zone.

11. A system for processing audio data, comprising:
an audio input unit for receiving audio data representing a piece of music;
an audio processing unit for processing the audio data;
an audio output unit for playing the audio data;
a gesture detecting apparatus for touchless detection of hand gestures of a user's hand;
wherein the gesture detecting apparatus is configured to detect a transport gesture of a user, wherein the transport gesture comprises the following sequence:
positioning the hand within a tolerance zone around a first virtual transport controller position which is a predetermined position in an area around the user;
gripping a virtual transport controller,
dragging the virtual transport controller, while holding a gripping posture, from the first virtual transport controller position to a second virtual transport controller position;
releasing the gripping posture; and
wherein the audio processing unit is configured to carry out a playback setting operation based on a transport gesture detected by the gesture detecting apparatus, the playback setting operation comprising at least one of the following operations:
starting playback of the audio data;
stopping playback of the audio data;
setting a playback position for playback of the audio data;
selecting a piece of music from among a plurality of pieces of music; and
operating the audio input unit to receive audio data representing the selected piece of music.

12. The system of claim 11, wherein the audio data represent a music release package comprising one piece of music or a set of consecutive pieces of music, said music release package having a finite playback duration, and wherein a timeline of the music release package is defined as running from a package start position to a package end position;

wherein the gesture detecting apparatus defines a virtual song path arranged in the area around the user and running continuously;

wherein a starting point is assigned to the package start position, an end point is assigned to the package end position, and intermediate points along the virtual song path between the starting point and the end point are assigned to respective intermediate playback positions between the package start position and the package end position along the timeline of the piece of music; and wherein, when the transport gesture is detected and the second virtual transport controller position at which the user has released the gripping posture in the transport gesture is within a second tolerance zone around the virtual song path, the audio processing unit is configured to set the playback position for playing the audio data in accordance with the second virtual transport controller position along the virtual song path, and to start or continue playback of the audio data from the playback position.

13. The system of claim 11, wherein the audio processing unit is configured to stop or keep stopping playback of the audio data, if a transport gesture is detected and the second virtual transport controller position at which the user has released the gripping posture within the transport gesture is within a predefined stop zone.

14. The system of claim 12, further comprising an artificial reality apparatus adapted to provide visual input for the user to create an artificial reality environment, wherein the artificial reality apparatus is adapted to display the virtual transport controller at a current virtual transport controller position in the area around the user.

15. The system of claim 14, wherein the artificial reality apparatus is configured to display at least one of a first virtual indication at the starting point of the virtual song path and a second virtual indication at the end point of the virtual song path.

16. The system of claim 15, wherein the first virtual indication is a first circle running through the starting point and/or the second virtual indication is a second circle running through the end point.

17. The system of claim 15, wherein the artificial reality apparatus is adapted to display a transport tag in association with the virtual transport controller or the first virtual indication or the second virtual indication, wherein the transport tag shows information regarding the playback position and/or regarding the piece of music currently played back within the music release package.

18. A method comprising the steps of providing, via an audio input unit, audio data representing a piece of music;

processing, via an audio processing unit, the audio data;

playing, via one or more speakers, the audio data;

detecting, by a touchless user interface, a hand position, which is a position in space of a hand of a user, and detecting, by the touchless user interface, a turntable approach gesture when the hand position enters a first tolerance zone around a virtual turntable position, which is a predetermined position in space in an area around the user;

providing, via a gesture detection apparatus, a gesture scratch mode, wherein, when the gesture scratch mode is activated, the method carries out a scratching operation, the scratching operation including at least one of setting a playback direction of the audio data depending on a direction of movement of the hand, and setting a playback rate of the audio data depending on a movement velocity of the hand; and wherein the gesture scratch mode is activated, upon touchless detection of the turntable approach gesture by the gesture detecting apparatus.

19. A method comprising the steps of:

providing, via an audio input unit, audio data representing a piece of music;

processing, via an audio processing unit, the audio data;

playing, via one or more speakers, the audio data;

detecting, via a gesture detection apparatus, a transport gesture of a user by a touchless user interface, wherein the gesture comprises the following sequence of gestures:

positioning a hand within a third tolerance zone around a first virtual transport controller position which is a predetermined position in an area around the user;

gripping a virtual transport controller;

dragging the virtual transport controller, while holding a gripping posture, from the first virtual transport controller position to a second virtual transport controller position;

releasing the gripping posture; and carrying out, via the audio processing unit and the one or more speakers, a playback setting operation based on a detected transport gesture, the playback setting operation comprising at least one of the following operations:

starting playback of the audio data;

stopping playback of the audio data;

setting a playback position for playback of the audio data;

selecting a piece of music from among a plurality of pieces of music; and operating the audio input unit to receive audio data representing the selected piece of music.

20. A non-transitory computer-readable medium embodying program code that, when executed by one or more processors, causes the processors to perform operations comprising:

providing, via an audio input unit, audio data representing a piece of music;

processing, via an audio processing unit, the audio data;

playing, via one or more speakers, the audio data;

detecting, by a touchless user interface, a hand position, which is a position in space of a hand of a user, and detecting, by the touchless user interface, a turntable approach gesture when the hand position enters a first tolerance zone around a virtual turntable position, which is a predetermined position in space in an area around the user;

providing, via a gesture detection apparatus, a gesture scratch mode, wherein, when the gesture scratch mode is activated, the operations further include scratching operation, the scratching operation including at least one of setting a playback direction of the audio data depending on a direction of movement of the hand, and setting a playback rate of the audio data depending on a movement velocity of the hand; and wherein the gesture scratch mode is activated upon touchless detection of the turntable approach gesture by the gesture detecting apparatus.

* * * * *